K. I. LINDSTRÖM.
MILKING APPARATUS.
APPLICATION FILED JUNE 5, 1906.

911,416.

Patented Feb. 2, 1909.
4 SHEETS—SHEET 1.

Witnesses.

Inventor
Knut Ivar Lindström
by Harry Connett
Attorney

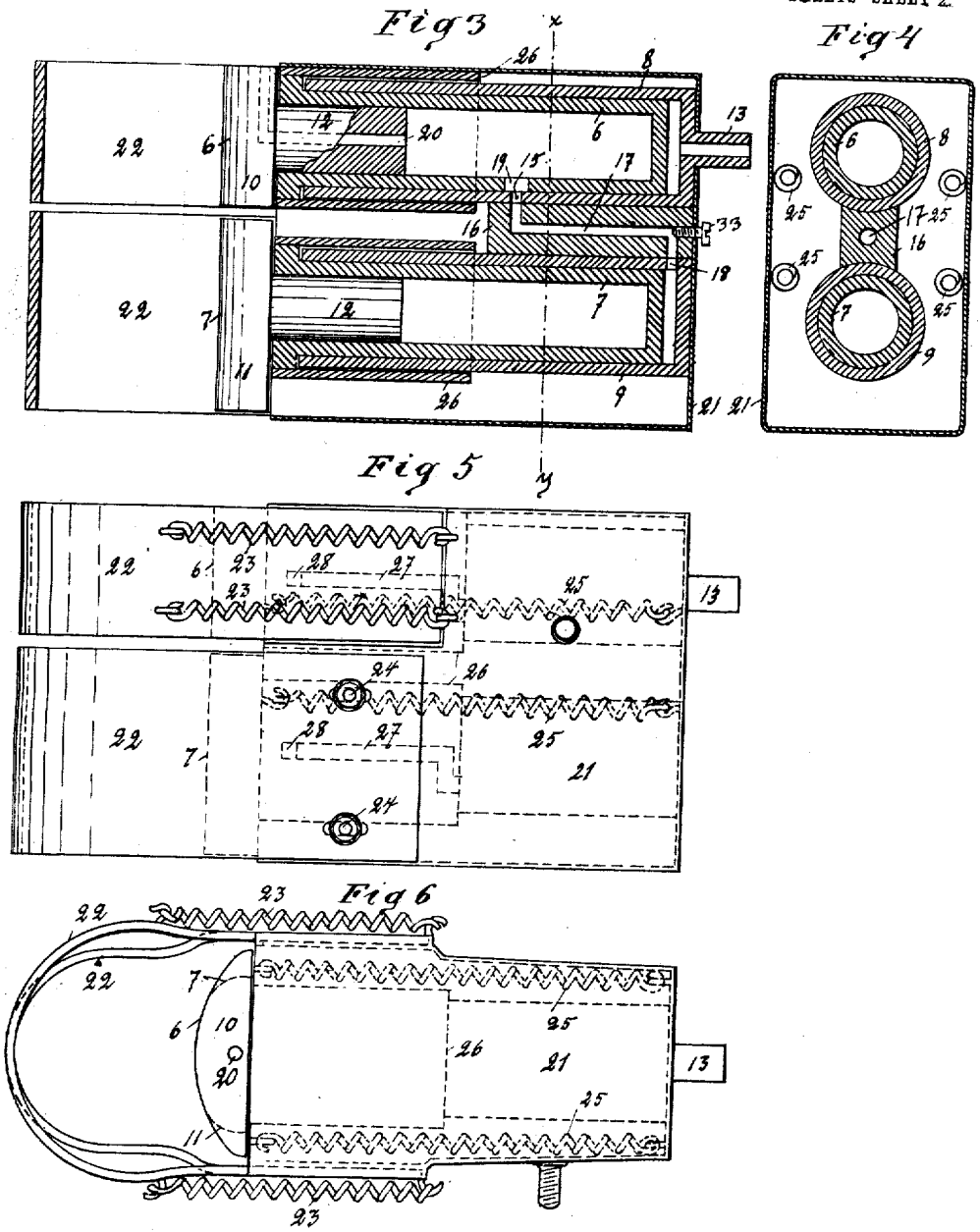

K. I. LINDSTRÖM.
MILKING APPARATUS.
APPLICATION FILED JUNE 5, 1906.

911,416.

Patented Feb. 2, 1909.

4 SHEETS—SHEET 3.

Witnesses:

Inventor
Knut Ivar Lindström

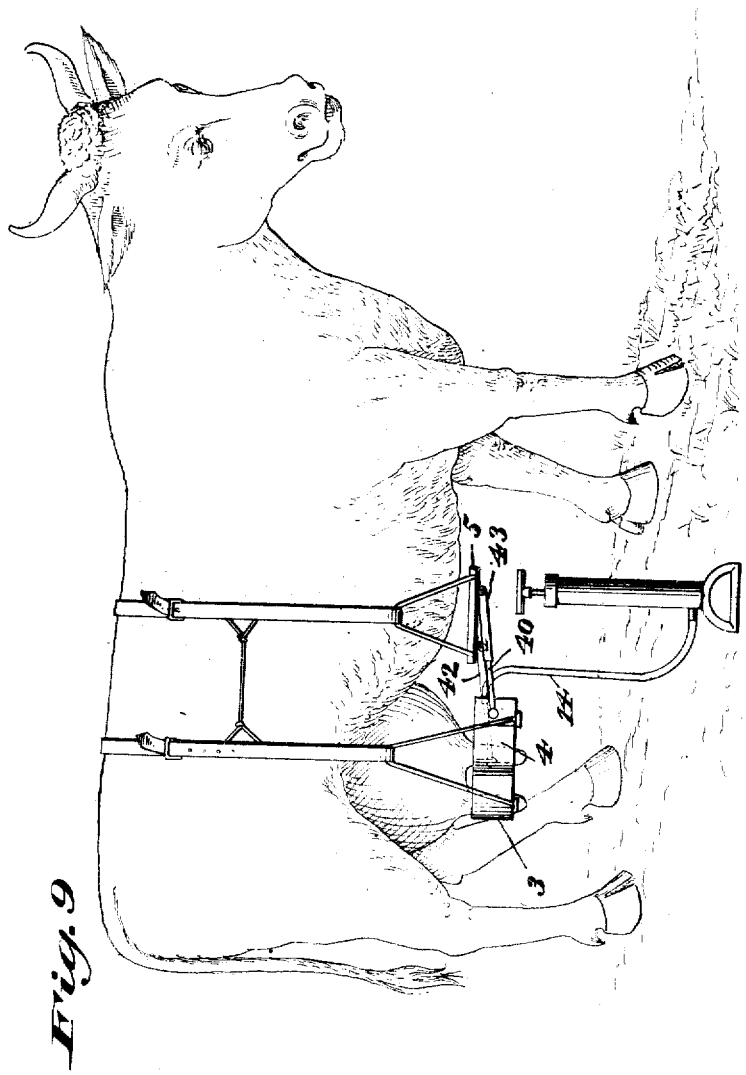

UNITED STATES PATENT OFFICE.

KNUT IVAR LINDSTRÖM, OF NYGVARN, SWEDEN.

MILKING APPARATUS.

No. 911,416.  Specification of Letters Patent.  Patented Feb. 2, 1909.

Application filed June 5, 1906. Serial No. 320,298.

*To all whom it may concern:*

Be it known that I, KNUT IVAR LINDSTRÖM, a subject of the King of Sweden, and resident of Nygvarn, in the Kingdom of Sweden, have invented certain new and useful Improvements in Milking Apparatus, of which the following is a specification, reference being had therein to the accompanying drawings.

This invention relates to a milking apparatus adapted to be applied to the cow or animal for effecting the milking operation mechanically. The said apparatus has four milking devices acting upon each of the teats and each consisting of two or more pistons or plungers gently squeezing the teat.

The characteristic feature of the apparatus consists in the milking devices being operated by compressed air acting to intermittently advance horizontal plungers, which are moved in cylinders, firmly connected and communicating with each other in certain positions of the plungers, in such manner that the plungers of the same milking device (*i. e.* acting upon the same teat) advance and return by turns. This is effected in a simple and effective manner, the compressed air being capable of entering a lower cylinder and advancing its plunger, only when an upper plunger has arrived to its fore end position, acted upon by the pressure from the compressed air in the cylinder, and the compressed air in a lower cylinder being discharged only when an upper plunger has been returned to or substantially to its initial position by a spring after an interruption in the pressure from the air. Consequently the plungers themselves act as distributing valves admitting compressed air into or discharging the same from the cylinders. The said apparatus is actuated by hand by means of an ordinary air pump with piston. Each time the piston of the said pump is moved forward, the plungers of the milking devices are forced forward in the manner stated, and when the piston of the pump is moved backward, the plungers of the milking devices return.

All the milking devices being of quite the same construction only one of the said devices is shown in the accompanying drawings.

Figure 1:
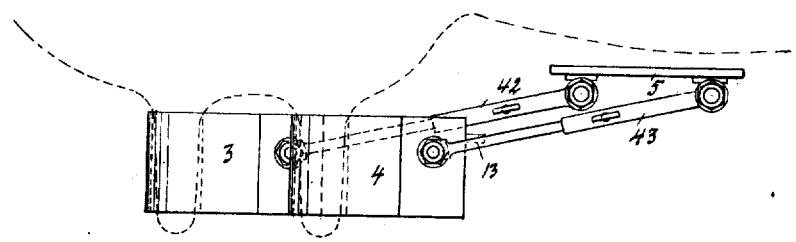
Figure 2:
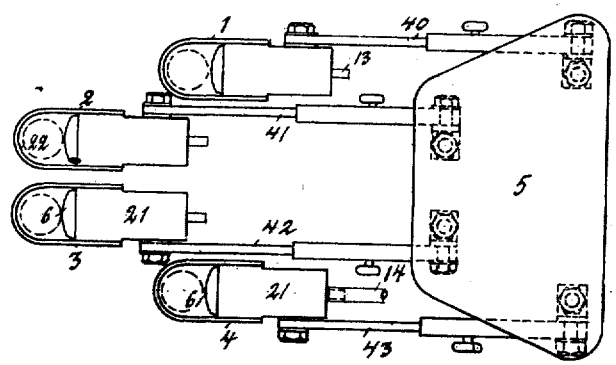
Figure 7:
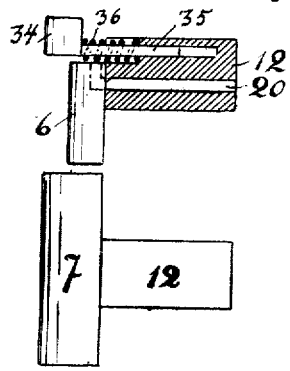
Figure 8:
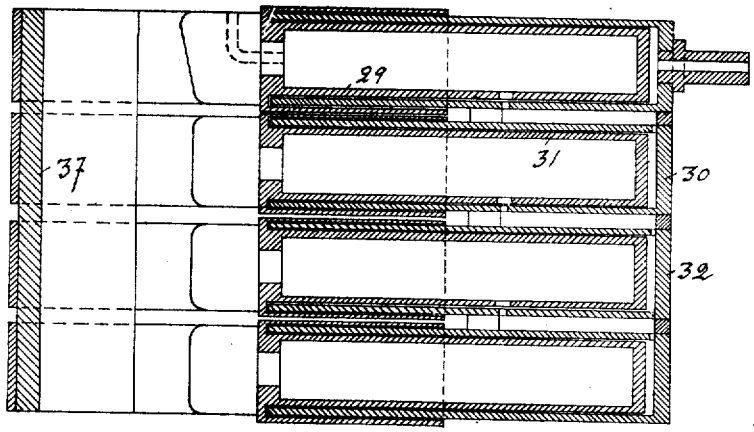

Figure 1 is a side view and Fig. 2 is a plan view of the principal parts of the apparatus. Fig. 3 is a vertical section on a greater scale of a milking device. Fig. 4 is a cross section on the line $x$ to $y$ of Fig. 3. Fig. 5 is a side view of the milking device and Fig. 6 is a plan view of the same. Fig. 7 shows a modified form of the upper plunger. Fig. 8 shows a further modification. Fig. 9 is a view showing the improved milking apparatus adjusted in position for use.

The four milking devices 1, 2, 3, 4, Fig. 2, are supported by arms 40, 41, 42, 43 respectively, extending from a common plate 5, which is fixed in a suitable manner to the ordinary yoke or the like, passed over the back of the cow. The said arms 40 to 43 are fixed to the plate 5 by means of pins and jam-nuts or the like, so that they can be adjusted horizontally as well as vertically. Each arm consists of two parts, one slid into the other and sliding in the same, said parts being adjustable by means of a jam-nut or the like, so that the arm can be extended or shortened. Consequently, the four arms can easily be adapted to the mutual positions of the teats, which is very different in different cows. The udder and the teats are indicated by dotted lines in Fig. 1. The number of plungers located one above the other in each of the milking devices may be two or more. In Figs. 3 to 6 there are only two plungers, but in Fig. 8 four plungers are shown as a modification. The two plungers are designated by 6 and 7 in Figs. 3 to 6. One end of the said plungers fits hermetically in the cylinders 8 and 9 respectively and the other, front end of the plungers is provided with a head or pad 10 and 11 respectively of india rubber or any other soft material. The said pad or head may be made as a separate piece and provided with a pin 12, inserted in the end of the plunger, which consists of a tubular piece, closed at its inner end, as shown in Fig. 4, or the pad may be of any other suitable construction. A short pipe 13 extends from the rear end of the cylinder 8, a rubber tube 14 being threaded on the said pipe and connecting the cylinder with the air pump.

The cylinder 8 is provided in its lower side wall substantially at the center with an opening 15, from which a channel 17, provided in a piece 16 mounted between the cylinders, leads backward to the cylinder 9, which in its upper side wall, behind the returned plunger 7 has a corresponding opening 18. The plunger 6 has in its lower side wall an opening 19, registering with the opening 15, when the plunger is in or substantially in its starting point, as shown in Fig. 3. In the same manner communication is provided between other plungers and cylinders, when there are more than two plungers, as shown in Fig. 8. The upper plunger 6 is provided in its front end with a channel 20 leading to the exterior air.

All cylinders are inclosed in a mantle or casing, open in its front end, to permit the plungers to move freely. To the said casing loop shaped pieces 22 are fixed, extending forward and forming a sleeve, into which the teat is inserted. The number of pieces 22 is preferably the same as the number of plungers, said pieces being situated in front of each of the plungers, as shown in Figs. 5 and 6, but any other number of pieces may be provided, as for instance three, said pieces being then correspondingly smaller in height. The sleeve 22 embraces with its shanks the casing 21, made of sheet iron or the like, and is movable for some distance longitudinally and in a direction parallel to the axis of the plunger, said sleeve being guided in a suitable manner. As for instance the shanks may slide in grooves in the outer side of the casing. One or more coil springs 23 under tension are fixed on each side of the sleeve 22 to a hook fixed in the said sleeve and to a hook fixed in the casing 21. The said springs tend to pull the sleeve backward as far as permitted by an abutment. The said abutment may consist of the end wall of the said groove, which is struck by the shank, or may be arranged in any other suitable manner. Both the loop shaped pieces or all the loop shaped pieces must not necessarily be yielding in the described manner, but the bottom piece may be fixed to the casing in an adjustable manner, as shown in Fig. 5, by means of nuts threaded on pins 24 fixed in the casing and passing through slots or the like provided in the shanks of the loop. Inside the casing other coil springs 25 under tension are provided, fixed between the head of the plunger and the rear part of the casing. The said springs return the plunger to its initial position. For the protecting of the plungers from dust and the like and for the controlling of their movement the plungers are provided with sleeves or collars 26, inclosing the front end of the cylinders. Each of the said collars is provided with a longitudinal slot 27, through which a pin 28 on the cylinder projects. In this manner the plungers are prevented from turning and are stopped in their forward movement.

The described apparatus operates in the following manner. As the piston of the pump is forced forward, the compressed air penetrates into the cylinder 8 through the pipe 13 and advances the plunger 6 to its fore, end position, determined by the pin or projection 28. During the said movement the rear end of the plunger just passes by the opening 15 of the channel 17, and the plunger squeezes the top part of the teat against the somewhat yielding support, formed by the sleeves 22. In this manner communication between the teat and the udder is shut off. As the plunger reaches the said end position, compressed air passes through the channel 17 into the cylinder 9 behind the plunger 7, forcing the same forward. The said plunger 7 now presses the milk contained in the teat further downward and causes the same to leave the teat. As the piston of the pump is returned and the pressure in the cylinder 8 is thereby relaxed, the plunger 6 is pulled backward by the springs 25 and after the plunger has returned such a distance, that its opening 19 registers with the opening 15 of the channel 17, the air passes from the cylinder 9 to the exterior air through the channel 17, the plunger 6 and the channel 20. Consequently the pressure in the cylinder 9 is relaxed or ceases and the plunger 7 is returned by the springs 25. The teat is now filled with milk from the udder, whereupon the plungers are again forced forward and so on. If there are more than two plungers, the milking operation is effected in the same manner, as will be seen from Fig. 8, the uppermost plunger 29 admitting compressed air into the next subjacent cylinder 30, the next plunger 31 into the next subjacent cylinder 32 and so on, the uppermost plunger being, consequently, advanced first and the lowermost last. When the pressure caused by the pump ceases, the uppermost plunger will return first, then the next plunger 31, thereafter the third plunger and so on, the lowermost one returning last.

From what is said above it is perceived, that the movements of the plungers forward and backward always are effected successively (by turns), so that a lower plunger cannot commence to move forward or backward, until the superposed plunger has occupied its fore, end position or has returned to or substantially to its initial position, an upper plunger maintaining a fixed and unchanged position, squeezing the teat, while a lower plunger is forcing the milk downward and causing the same to leave the teat. Consequently the milking device effects the same work as is performed in milking correctly by hand. By a screw valve 33 the communication between the cylinders can be narrowed, so that the movement of a plunger is delayed more or less in relation to the movement of the preceding plunger. The four milking devices act in the same manner, each being connected with the pump by a tube. By means of cocks or the like in the tubes any one of the milking devices can be stopped.

The modification, shown in Fig. 7, consists in the head of the uppermost plunger being divided horizontally in two parts the upper one 34 being provided with a pin 35 sliding in the plunger, longitudinally to the same, and kept in a somewhat projecting position by a coil-spring 36. As the plunger is being moved forward, the teat is acted upon first by the upper part 34, which returns a short distance, the plunger as a whole being then pressed against the teat. The object of the said arrangement is that pressure may be applied to the teat first as near the root of the same as possible and then farther downward on the same. The support 22 may, if wanted, be provided with an inner soft lining 37, preferably made in one piece, as shown in Fig. 8.

Having now described my invention, what I claim as new and desire to secure by Letters Patent is:

1. In milking machines a milking device, consisting of a plurality of pistons, moving relatively to cylinders and means for bringing said cylinders in communication with each other when the pistons have moved a little relatively to the cylinders.

2. In milking machines a milking device, consisting of a plurality of pistons, moving relatively to cylinders, channels between said cylinders and means for bringing each cylinder in communication with the next one when the piston of the former one has moved a distance in its cylinder.

3. In milking machines a milking device, consisting of a plurality of pistons moving in cylinders, channels between said cylinders and means for bringing each cylinder in communication with the next one when the piston of the former has moved a little in its cylinder.

4. In milking machines, a milking device consisting of a plurality of pistons moving in cylinders, channels between said cylinders, the piston of each cylinder closing the opening of the channel from said cylinder to the next one, when the piston is in its innermost position.

5. In milking machines a milking device, consisting of a plurality of pistons arranged one above another and moving in cylinders, each upper cylinder communicating with the next one, when the piston of the former one is in its outermost position, but not communicating with the said latter cylinder, when said piston is in its innermost position.

6. In milking machines, a milking device consisting of a plurality of pistons moving in cylinders, channels between said cylinders, the one end of each channel opening in the side of the corresponding cylinder.

7. In milking machines a milking device consisting of a plurality of pistons moving in cylinders, channels between said cylinders, the one end of each channel opening in the side of the corresponding cylinder, the end surface of the piston of said cylinder being located on the one side of said opening, when the piston is in its one end position, but on the opposite side, when it is in its other end position.

8. In milking machines, a milking device having two cylinders, two pistons, each movable along one of the respective cylinders, and means for supplying fluid under pressure to each cylinder to move the corresponding piston along the same, the fluid supplying means for one cylinder being controlled from the movement of the piston in the other cylinder.

9. In milking machines, a milking device having two cylinders, two pistons, each capable of movement along one of the respective cylinders, means for supplying fluid under pressure to one cylinder for moving the corresponding piston along the same, and means, controlled from the movement of such piston, for supplying fluid under pressure to the other cylinder for moving the corresponding piston along the same.

10. In milking machines, a milking device having two cylinders, two pistons, each movable along one of the respective cylinders, means for supplying fluid under pressure to one cylinder for moving the corresponding piston along the same, and a passage, extended from such cylinder and controlled by the movement of the piston therein, and adapted for communication with the other cylinder for supplying fluid under pressure thereto.

11. In milking machines, a milking device having a main cylinder provided with a port, a piston movable along the cylinder and adapted, when moved in one direction, to expose said port, and when reversely moved, to occlude said port, means for supplying fluid under pressure to said cylinder to move said piston along the same, another cylinder, a piston movable along the same, and a passage affording communication from the port of the first-named cylinder to said last-named cylinder and adapted to supply fluid under pressure to said last-named cylinder to move the piston along the same.

In witness whereof I have hereunto signed my name this 21st day of May 1906, in the presence of two subscribing witnesses.

KNUT IVAR LINDSTRÖM.

Witnesses:
HJ. ZETURSTRÖM,
AXEL EHRNERL.